United States Patent
Reed

(10) Patent No.: US 6,850,988 B1
(45) Date of Patent: Feb. 1, 2005

(54) SYSTEM AND METHOD FOR DYNAMICALLY EVALUATING AN ELECTRONIC COMMERCE BUSINESS MODEL THROUGH CLICK STREAM ANALYSIS

(75) Inventor: David Reed, Camas, WA (US)

(73) Assignee: Oracle International Corporation, Redwood Shores, CA (US)

( * ) Notice: Subject to any disclaimer, the term of this patent is extended or adjusted under 35 U.S.C. 154(b) by 607 days.

(21) Appl. No.: 09/662,776

(22) Filed: Sep. 15, 2000

(51) Int. Cl.[7] .............................................. G06F 15/173
(52) U.S. Cl. ...................... 709/238; 715/513; 715/514; 707/3
(58) Field of Search ...................... 705/7, 10; 709/238; 715/513, 514; 707/2, 3, 9, 10, 102

(56) References Cited

U.S. PATENT DOCUMENTS

| | | | |
|---|---|---|---|
| 4,547,847 A | * 10/1985 | Olig et al. | 700/52 |
| 5,446,891 A | * 8/1995 | Kaplan et al. | 707/2 |
| 5,895,470 A | * 4/1999 | Pirolli et al. | 707/102 |
| 5,991,735 A | * 11/1999 | Gerace | 705/10 |
| 6,177,932 B1 | * 1/2001 | Galdes et al. | 345/733 |
| 6,230,153 B1 | * 5/2001 | Howard et al. | 707/2 |
| 6,327,574 B1 | * 12/2001 | Kramer et al. | 705/14 |
| 6,466,970 B1 | * 10/2002 | Lee et al. | 709/217 |
| 6,470,383 B1 | * 10/2002 | Leshem et al. | 709/223 |
| 6,473,084 B1 | * 10/2002 | Phillips et al. | 345/440 |
| 6,654,735 B1 | * 11/2003 | Eichstaedt et al. | 707/3 |

FOREIGN PATENT DOCUMENTS

WO  WO 00/26836 A2   5/2000

OTHER PUBLICATIONS

"Rubric Introduces E–Marketing Data Mart for Intergrating Closed Loop E–Marketing System", Business Wire, New York, Jul. 6, 1999, three pages.*

Michael Monticino, "Web–Analysis: Stripping Away the Hype," Computer, Dec. 1998, XP–002230375, pp. 130–132.

* cited by examiner

*Primary Examiner*—Andrew Joseph Rudy
(74) *Attorney, Agent, or Firm*—Hickman Palermo Truong & Becker LLP

(57) ABSTRACT

A system and method for dynamically evaluating an electronic commerce business model through click stream analysis is disclosed. An electronic commerce business model is incorporated into a Web site. The Web site includes a plurality of related Web pages structured in a hierarchical manner. Each Web page includes one or more hyperlinks selectable by a user. A plurality of data vectors is stored. Each data vector represents a click stream path through the Web site. Each data vector includes a set of data entries that each corresponds to Web content selected via the hyperlinks in the related Web pages. Each click stream path is classified based on at least one such data entry in the data vector. The classified click stream path shares at least one common characteristic with one or more other click stream paths. The classified click stream paths are analyzed according to a pre-defined evaluation procedure directed at determining at least one of efficacy of presentation and shifts in demography. The electronic commerce business model is compared to the classified click stream paths analysis.

13 Claims, 12 Drawing Sheets

SYSTEM AND METHOD FOR DYNAMICALLY EVALUATING AN ELECTRONIC COMMERCE BUSINESS MODEL THROUGH CLICK STREAM ANALYSIS

FIELD OF THE INVENTION

The present invention relates in general to dynamic click stream analysis and, in particular, to a system and method for dynamically evaluating an electronic commerce business model through click stream analysis.

BACKGROUND OF THE INVENTION

The methods and means for transacting commerce continue to evolve in close step with technological advances. For instance, the traditional ways of selling goods and services, the so-called "brick and mortar" approach, have expanded into remote sales through mail order and telephonic catalog sales and television-based shopping "networks." Electronic commerce ("e-commerce") presents the latest approach to transacting remote sales and related commerce.

E-commerce is primarily computer network-based and requires a three-part support infrastructure. First, individual consumers must have some form of client computer system, such as a personal computer typically executing a browser application. Second, businesses must field a host computer system executing a server application and an associated database. The database ordinarily stores information on the goods and services offered. Finally, the host computer system must be interconnected to each client computer system via a data network or similar form of interconnectivity. The data network can include intranetworks, also known as local area networks, and wide area networks, including public information internetworks, such as the Internet, and any combination thereof.

Most e-commerce systems are Web-based. Typically, the host computer system executes a server application for presenting a Web site that creates a virtual, user-readable "storefront." The storefront is actually a series of downloadable Web pages structured in a hierarchical manner with embedded hyperlinks connecting to other related Web pages and content. The Web site is organized as a catalog of goods and services and includes means for secure purchasing. During operation, consumers transact commerce in a purchasing session consisting of requests for Web pages sent to and replies received from the host computer system.

E-commerce differs from traditional commerce means in several respects. Unlike traditional methods, the bulk of interaction between the consumer and vendor is through an impassive computer system and there is generally little to no opportunity to offer person-to-person, individualized sales and service. As well, the immediacy of purchasing and ease of comparison shopping results in low customer loyalty. Moreover, competitive drivers short-circuit the selling process by pro-actively soliciting sales with targeted specials sold at low margins. These competitive drivers work to entice a consumer to visit a competing vendor's Web site, potentially resulting in lost sales. E-commerce vendors attempt to address these differences by incorporating presentation and demographic business models into their Web sites.

Presentation models describe the physical layout and functionality of a virtual storefront. Presentation models are the Web-based equivalent of conventional consumer marketing. However, the effectiveness of a presentation model is difficult to judge due to the lack of subjective customer feedback. Conventional measurement methodologies for brick-and-mortar storefronts fail to provide sufficient an adequate solution. For instance, sales volumes and repeat Web site visits only partially reflect a Web site's effectiveness. Incomplete transactions and failed product searches are typically not measured nor analyzed yet could provide valuable insight into a Web site's effectiveness.

The demographic model implements the actual sales model based on statistical and behavioral models of measured and predicted consumer buying habits. Conventionally, demographic data is fairly static and is generally collected and processed periodically to determine consumer behavioral and purchasing trends. Demographic analysis is performed generally through applied artificial intelligence and statistical modeling. Persuasive factors and dependent variables are identified and weighed and, if necessary, new demographic models are built. However, e-commerce-based demographics tend to fluctuate much more rapidly than conventional demographics and periodic processing can result in lost sales volume. Depending upon the e-commerce Web site, both presentation and demographic models can age at an unknown rate.

In the prior art, click stream analysis has been used to evaluate their business models. Theoretically, every consumer's visit can be tracked, step-by-step, by collecting and storing the "click stream" of Web pages and content selections made during a given visit to the vendor's Web site. These click streams can be analyzed to determine purchasing trends and consumer behaviors. However, click stream analysis has historically not been performed due to the extremely high volume of traffic. Moreover, the off-line processing techniques used to evaluate demographic models are based on relatively static data sets. Such processing techniques are slow and ill-suited for dynamic e-commerce applications.

Therefore, there is a need for an approach to dynamically analyzing and evaluating business models incorporated into e-commerce Web sites. Preferably, such an approach would utilize click stream data representing a path through a Web site. Such an approach could be used to validate presentation and demographic models in a responsive, potentially near real-time manner.

There is a further need for an approach to collecting and analyzing large data sets of on-line streams of Web page and content selections. Such an approach could be used to form structured data sets amenable to conventional data mining techniques.

SUMMARY OF THE INVENTION

The present invention provides a system and method for evaluating an e-commerce business model through on-the-fly click stream analysis. Click streams are collected and analyzed concurrent to on-going Web server operations. Each click stream records a path through the e-commerce Web site representing the selections of Web pages and content made by visiting consumers. The click stream paths are stored as data vectors, preferably reduced in size, and classified. The click stream paths are then analyzed using analytical processing and data mining techniques and the e-commerce business models are validated. If necessary, new models are generated.

An embodiment of the present invention is a system and method for transacting electronic commerce via a hierarchically structured Web site with click stream feedback. A plurality of individual Web pages structured in a hierarchical manner as a Web site are served. Each Web page includes one or more hyperlinks selectable by a user to provide at least one of another Web page and content. A click stream for each user session on the Web site is collected. The click stream includes data entries recording one or more of the hyperlinks selected during the user session. Each collected click stream is processed. The collected click stream are classified into one or more pre-defined categories describing characteristics shared by a plurality of the click streams. The collected click stream are analyzed. One or more structured queries are executed on the collected click streams based on at least one of the data entries and the shared characteristics. Alternatively or in addition thereto, data mining is performed on the collected click streams by assigning an independent variable and at least one dependent variable and determining the relative weightings thereon.

A further embodiment of the present invention is a system and method for dynamically evaluating an e-commerce business model through click stream analysis. An e-commerce business model is incorporated into a Web site. The Web site includes a plurality of related Web pages structured in a hierarchical manner. Each Web page includes one or more hyperlinks selectable by a user. A plurality of data vectors is stored. Each data vector represents a click stream path through the Web site. Each data vector includes a set of data entries that each corresponds to Web content selected via the hyperlinks in the related Web pages. Each click stream path is classified based on at least one such data entry in the data vector. The classified click stream path shares at least one common characteristic with one or more other click stream paths. The classified click stream paths are analyzed according to a pre-defined evaluation procedure directed at determining at least one of efficacy of presentation and shifts in demography. The e-commerce business model is compared to the classified click stream paths analysis.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
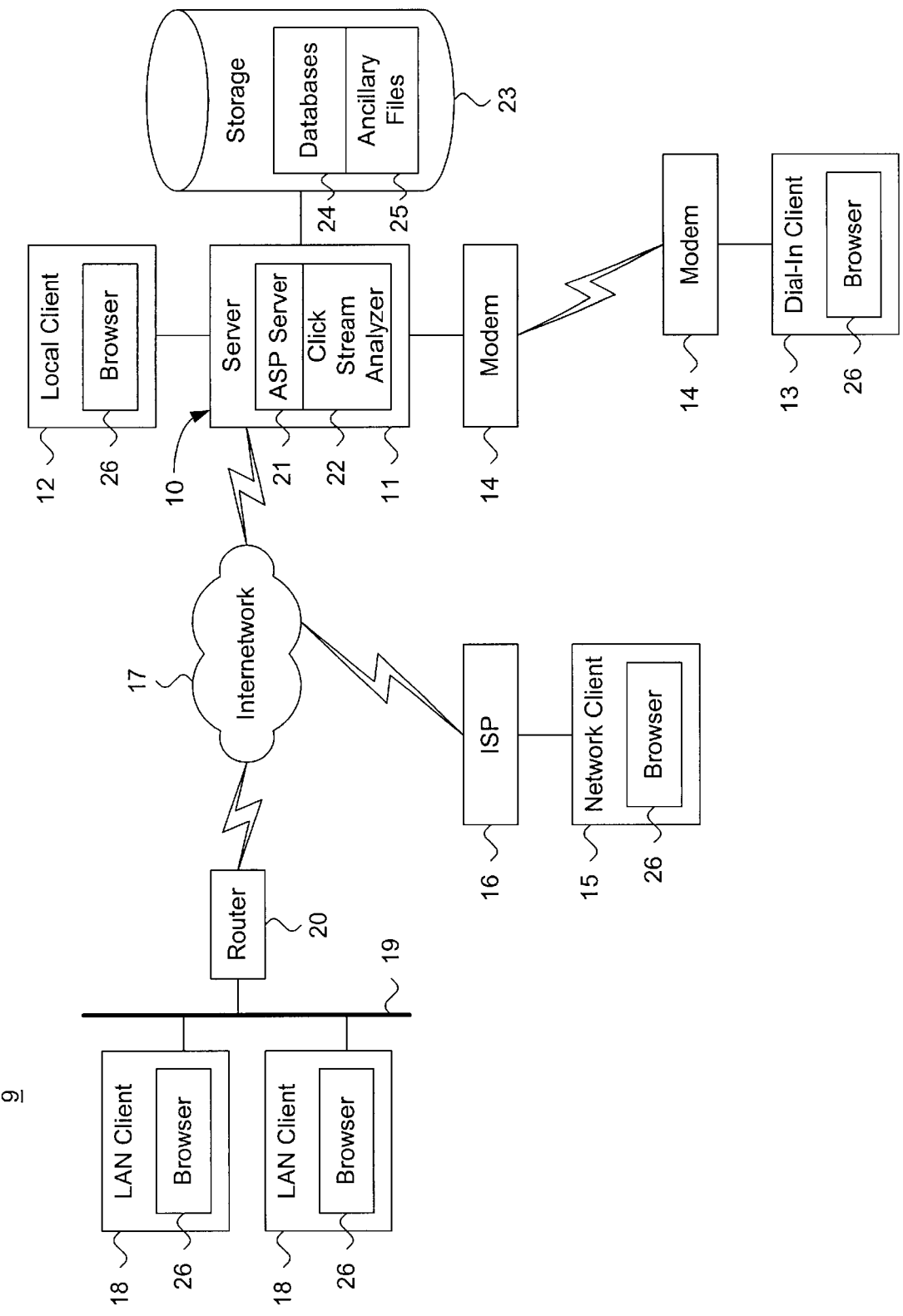
FIG. 1 is a block diagram showing a distributed computing environment, including a system for dynamically evaluating an e-commerce business model through click stream analysis, in accordance with the present invention.

FIG. 1 is a block diagram showing a distributed computing environment 9, including a system 10 for dynamically evaluating an e-commerce business model through click stream analysis, in accordance with the present invention. The system 10 consists of a server 11 operating on a host computer system that serves Web pages and content to a plurality of clients.

Various types of clients can be interconnected to the server 11. These clients include a local client 12 interconnected directly to the server 11 and a dial-in client 13 interconnected via a set of modems 14. In addition, a network client 15 can be interconnected through an Internet service provider (ISP) 16 that is interconnected to the server 11 via an internetwork 17, including the Internet. Similarly, one or more local area network (LAN) clients 18 can be interconnected to the server 11 via an intranetwork 19 that is itself interconnected to the internetwork 17 via a router 20 or similar device. Other types of clients, network topologies and configurations, and forms of interconnection are feasible.

In addition to performing those tasks ordinarily associated with hosting network services, the server 11 executes two principal applications: an active server presentation (ASP) server 21 and a click stream analyzer 22. The ASP server 21 functions as the primary interface to the individual clients through a dynamically generated virtual "storefront" for transacting e-commerce. The server 11 includes a secondary storage device 23 in which databases 24 and ancillary files 25 are maintained. The databases 24 and ancillary files 25 are further described below with reference to FIG. 2.

The virtual storefront is implemented as a Web site that is accessible to the clients over the "Web." The Web, shorthand for "Worldwide Web," loosely refers to session-oriented data communications occurring in a networked computing environment and conforming to the Hypertext Transport Protocol (HTTP). HTTP communications usually occur over Transmission Control Protocol/Internet Protocol-based (TCP/IP) data networks, although other types of packet switched data networks also support HTTP. The HTTP suite is described in W. R. Stevens, "TCP/IP Illustrated," Vol. 3, Chs. 13–14, Addison-Wesley (1996), and the TCP/IP suite is described in W. R. Stevens, "TCP/IP Illustrated," Vol. 1, Ch. 1 et seq., Addison-Wesley (1994), the disclosures of which are incorporated herein by reference.

The virtual storefront Web site is organized as a catalog of goods and services. Preferably, the Web site includes means for making secure purchases. The Web site consists of a series of dynamically generated, individually downloadable Web pages. The Web pages are structured in a hierarchical manner. Consumers navigate through the Web site by selecting linked Web pages and content using the embedded hyperlinks via a browser application 26. Browser applications 26 suitable for use in the present invention include the Internet Explorer, licensed by Microsoft Corporation, Redmond, Wash., and the Navigator, licensed by Netscape Corporation, Mountain View, Calif.

Each Web page or content selection by a consumer constitutes a "Click," that is, an affirmative selection of a linked item or action specified via a client input means, such as a keyboard, mouse or similar input device. The series of selections made by a consumer during any given e-commerce session constitutes a click stream. The click streams for the population of consumers visiting a vendor Web site are analyzed by a click stream analyzer 22 for use in dynamically evaluating e-commerce business models, as further described below with reference to FIG. 2.

The individual computer systems, including the server 11 and clients 12, 13, 15, 18, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
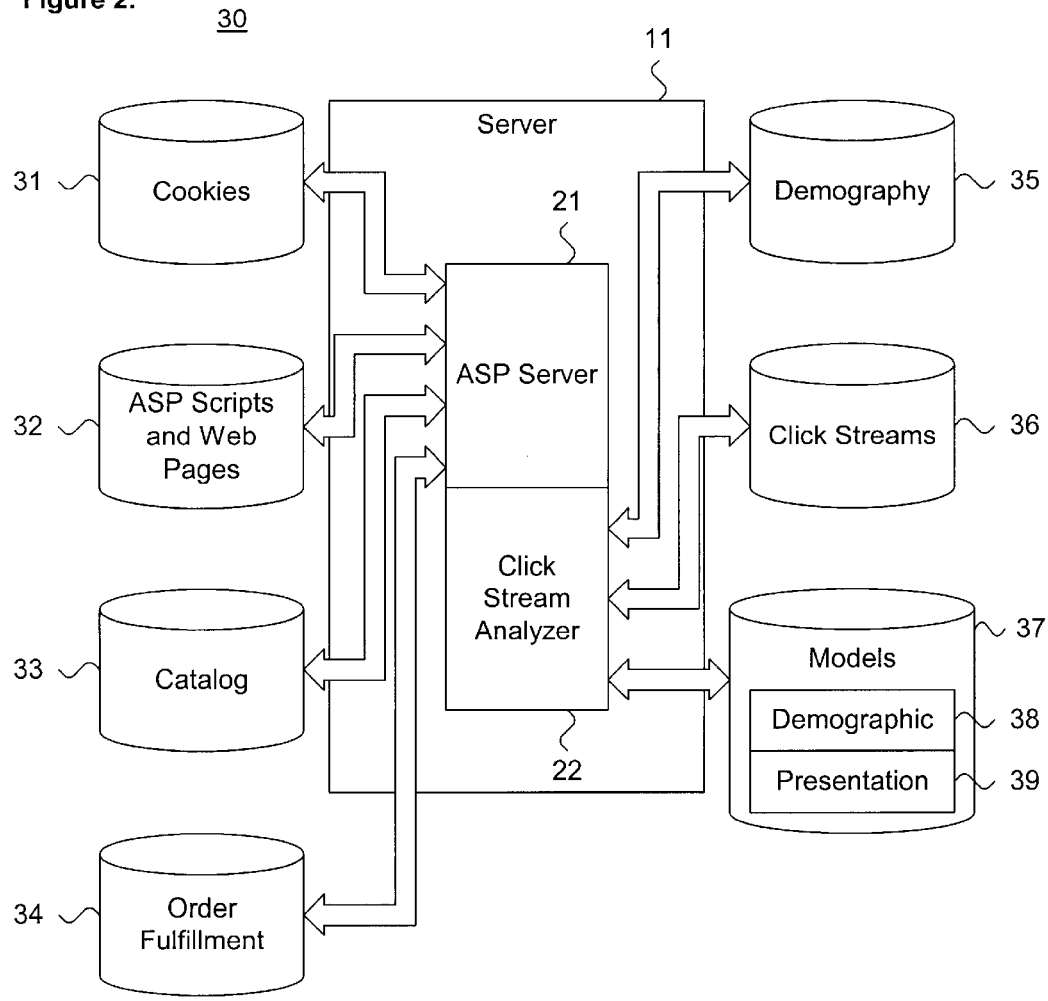
FIG. 2 is a detail block diagram showing the system for dynamically evaluating an e-commerce business model through click stream analysis of FIG. 1.

FIG. 2 is a detail block diagram showing the system 10 for dynamically evaluating an e-commerce business model through click stream analysis of FIG. 1. There are seven main sets of databases 24: cookies 31, active server page (ASP) scripts and Web pages 32, catalog 33, order fulfillment 34, demography 35, click streams 36, and models 37. The ASP server 21 uses the cookies 31, active server page (ASP) scripts and Web pages 32, catalog 33, order fulfillment 34 databases. The click stream analyzer 22 uses the demography 35, click streams 36, and models 37 databases. In the described embodiment, the databases operate under a relational database management system, such as Oracle 7, licensed by Oracle Corporation, Redwood Shores, Calif.

The cookies database 31 stores user profile information on individual clients indexed by a unique set of "cookies." Each cookie is a unique, 256-byte data value assigned to registered consumers. Individual cookies are stored by the browser applications 26 (shown in FIG. 1) and sent to the server 11 at the start of a transaction session. On most browser applications 26, cookies are optional. However, when enabled, cookies can allow personal and demographic information to be linked dynamically to a given consumer instead of generic consumer information.

The ASP scripts and Web pages ("scripts") database 32 stores the virtual storefront. The ASP server 21 (shown in FIG. 1) generates the individual Web pages and content for the Web site. The ASP server 21 executes the ASP scripts and Web page code stored in the scripts database 32. The ASP server 21 interprets server-executable ASP scripts embedded within default Web pages to customize the Web page to each consumer based on the demographic model 38 and presentation model 39. Each Web page is written as a script in a tag-delimited, page description programming language, such as the Hypertext Markup Language (HTML) or the Extensible Markup Language (XML). Each Web page preferably includes embedded hyperlinks connecting that Web page to other related Web pages and content, such as files, images, dialogue boxes, and the like.

In the described embodiment, the Active Server Page technology, licensed by Microsoft Corporation, Redmond, Wash., is used. Upon execution by the ASP server 21, the ASP scripts are converted into pure Web content, typically written in HTML or XML. In the described embodiment, the Active Server Pages are written as either JavaScripts or VBScripts, both of which are described in A. K. Weissinger, "ASP in a Nutshell, A Desktop Quick Reference," Chs. 1–3, O'Reilly & Assocs. (1999), the disclosure of which is incorporated herein by reference.

The catalog database 33 stores information about the goods and services offered by the vendor. The ASP server 21 incorporates this information into Web pages. Similarly, the order fulfillment database 34 stores information necessary to complete an order placed by a consumer. This information can include individual consumer data, shipping options and rates, tax rates, and related data necessary to completing a transaction.

The demography database 35 stores consumer demographic information, both on an individualized and categorical basis. Demographic information is relatively stable information with changes at a slow rate. Such information can include the age, income, personal traits, and geographic location for a consumer, as well as statistically derived information about other consumers sharing the same relative characteristics. Demographic information can be purchased from data research companies as well as derived by the vendor based on an analysis of buying trends on their Web site.

The click streams database 36 stores data vectors representing click streams. One click stream is created per consumer session. Each selection made by a consumer, that is, each "click," is recorded as a data entry in a data vector, as further described below with reference to FIG. 5. A selection can correspond to a Web page or content, as identified by a Uniform Resource Locator (URL).

The models database 37 includes two ancillary files 25, demographic model 38 and presentation model 39. These models are the e-commerce business models used by a vendor and are incorporated into a Web site through execution of the ASP scripts and Web page code. The demographic model 38 implements assumptions on consumer behavior derived through artificial intelligence and statistical modeling techniques, as are known in the art. The demographic model 38 is structured into categories that are tied to individual consumers through the cookies database 31.

The presentation model 39 implements the actual appearance and functionality of a Web site. The presentation model 39 defines Web page organization and format, as well as implements searching strategies and ease-of-use issues.

Figure 3:
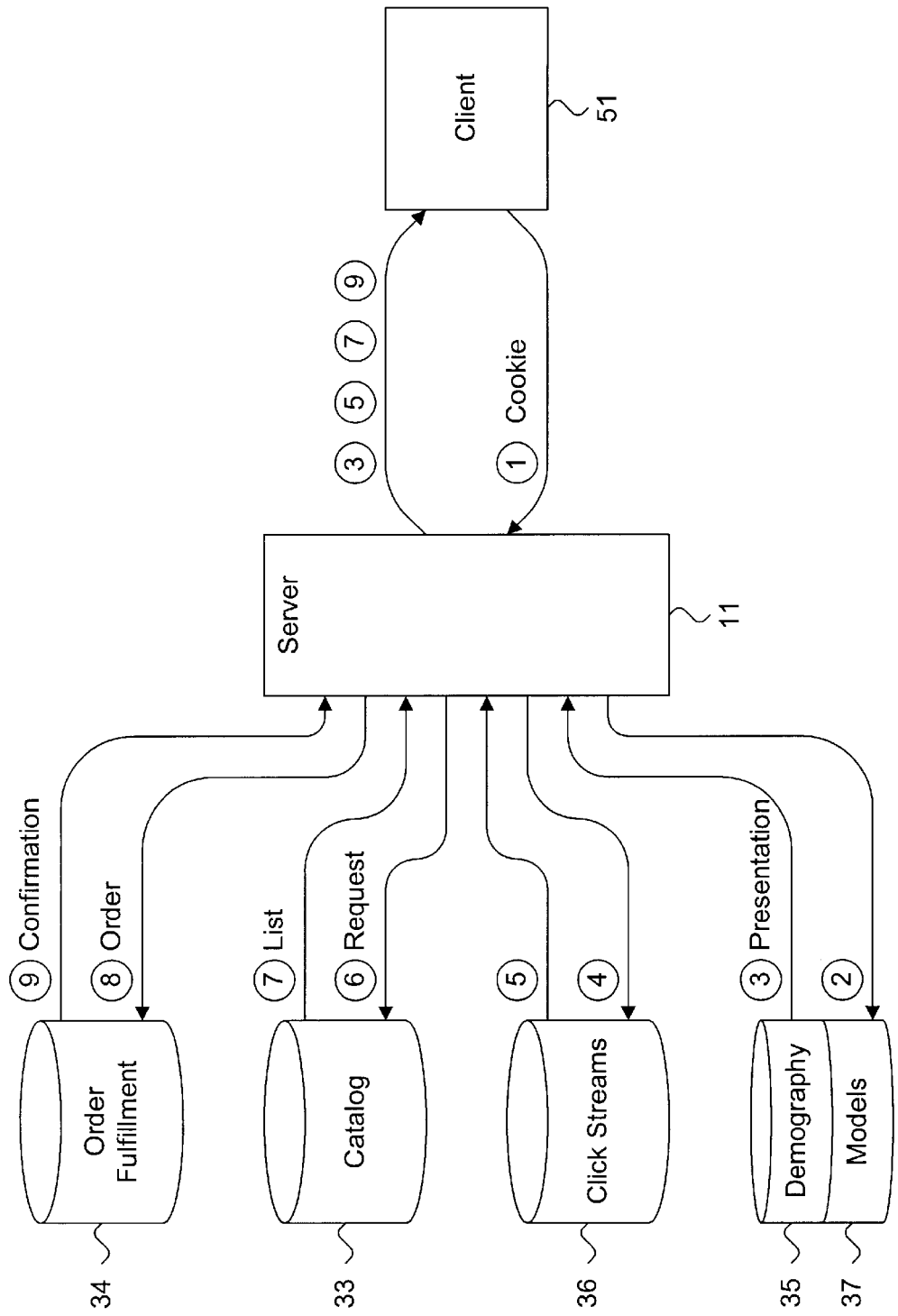
FIG. 3 is a flow diagram showing a sample e-commerce order processing sequence.

FIG. 3 is a flow diagram showing a sample e-commerce order processing sequence 50. In this sample sequence, a client 51 transacts an order with a vendor executing an e-commerce Web site on the server 11. At the outset of a session, a browser application 26 (shown in FIG. 1) executing on the client 51 sends a cookie to the server 11 (operation ①)) that retrieves a user profile from the cookies database 31 (not shown). Based on retrieved user profile (operation ②), the demographic information for that consumer and the demographic and presentation models are retrieved from the demography database 35 and models database 37 (operation ③). The server generates Web pages that are served to the consumer (operation ③).

The remainder of the order processing sequence is determined by user selections ("clicks"). Each user selection (operation ④) is stored in a vector created for the session in the click streams database 36 and, in response, appropriate Web pages and content are returned (operation ⑤). For instance, if the consumer sends a request for product information (operation ⑥)) or executes a search, a list of consumer information is retrieved from the catalog database 33(operation ⑦), or similar content is returned to the consumer. Analogously, if the consumer places an order (operation ⑧), individualized user data and business transaction information is retrieved from the order fulfillment database 34 (operation ⑨). This sequence of operations is repeated, in full or in part, for each consumer ordering session and a click stream vector is stored for dynamically analyzing the underlying e-commerce business models, as further described below with reference to FIG. 8 et seq.

Figure 4:
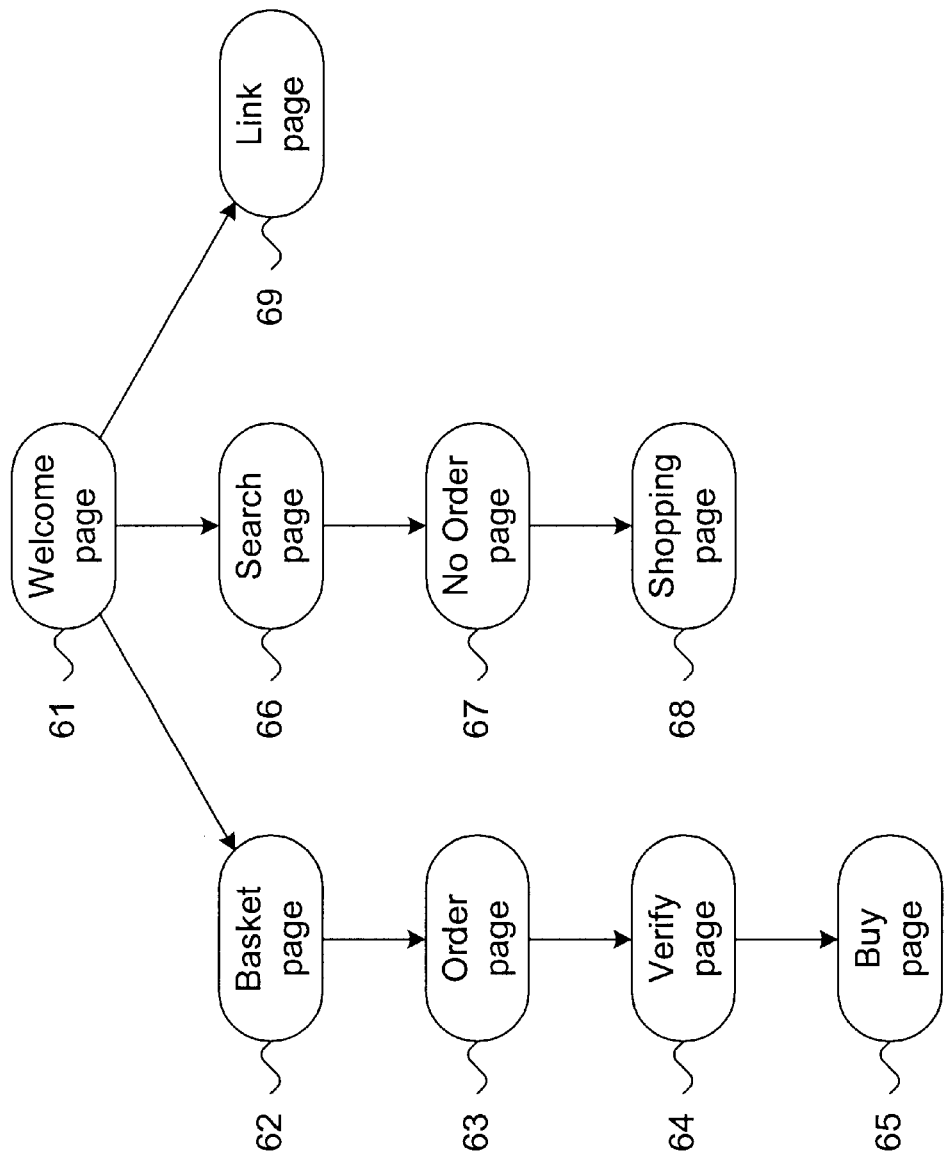
FIG. 4 is a tree diagram showing, by way of example, a set of potential click stream paths through a hierarchically structured Web site.

FIG. 4 is a tree diagram showing, by way of example, a set of potential click stream paths 60 through a hierarchically structured Web site. Each node in the tree represents a Web page identified by a unique URL and the lines connecting the nodes represent selections ("clicks"). For instance, a company named "Acme Corporation" might have a Web site with a Welcome page having the URL of "http://www.acme.com/home.htm." A consumer would enter this URL into the browser application 26 (shown in FIG. 1) and a request for that page, including a cookie, would be sent to the server 11. In reply, the server would generate a customized Welcome page and serve that Web page to the browser application 26.

The first sample click stream path (nodes 61–65) illustrates a product purchase. Briefly, a product purchase ordinarily requires placing a product (or service) into a temporary holding bin, sometimes called a "shopping basket," for the session, editing the order, verifying consumer information, and transacting the purchase. Thus, upon receiving the customized Welcome page (node 61), a consumer would place an item for purchase into the shopping basket by selecting a Basket page (node 62). Upon completion of shopping, the consumer would review all of the items selected for purchase by selecting an Order page (node 63). The consumer would verify the selected items by selecting a Verify page (node 64). Finally, the consumer would transact the purchase by selecting a secure Buy page (node 65).

The second sample click stream path (nodes 61, 66–68) illustrates an incomplete product purchase. Briefly, an incomplete product purchase occurs whenever a session ends without the consumer transacting a purchase. This scenario covers an almost unlimited set of potential click stream paths, but the most common path generally involves a failed product search. Thus, upon receiving the customized Welcome page (node 61), a consumer might begin by searching for a particular item using a Search page (node 66). After several rounds of unsuccessful searching, the consumer would decline purchasing products by selecting a No Order page (node 67) and would then resume "browsing" of the Web site by selecting a general purpose Shopping page (block 68) offered via a hyperlink to the Welcome page.

The third sample click stream path (nodes 61, 69) illustrates cross sales. Cross sales reflects business affiliations between separate business entities and are affected by embedding hyperlinks to an affiliated Web site into their respective Web sites. Thus, as before, upon receiving the customized Welcome page (node 61), a consumer might immediately decide to jump to an affiliated Web site by selecting a Link page (node 69).

The foregoing click stream paths are merely illustrative and countless variations of click stream paths, including paths that include pushed Web content originating from the server 11 without user selection, are feasible.

Figure 5:
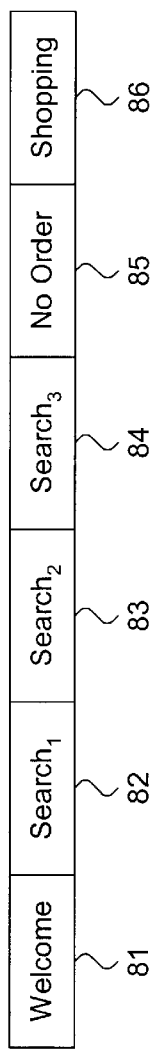
FIG. 5 is a block diagram showing, by way of example, a data path vector.

FIG. 5 is a block diagram showing, by way of example, a data path vector 80. This data path vector 80 stores the second sample click stream path (nodes 61, 66–68) of FIG. 4 as a set of data entries 81–86. Each data entry corresponds to the URL of the Web content upon each successive "click." Thus, the Welcome page (node 61) is stored as data entry 81. Assuming the consumer selected the Search page three times (node 66) before giving up, each search attempt would be stored as in successive data entries 82–84. Similarly, the No Order page (node 67) and Shopping page (node 68) would be stored as data entries 85 and 86, respectively.

Each data vector 80 is stored in the click streams database 36 (shown in FIG. 2). Note the full URL need not be stored. The volume of data generated by storing every click stream path for every consumer can quickly add up. Consequently, only that descriptive information minimally required to uniquely identify each Web page need be stored in the data path vector 80.

Figure 6:
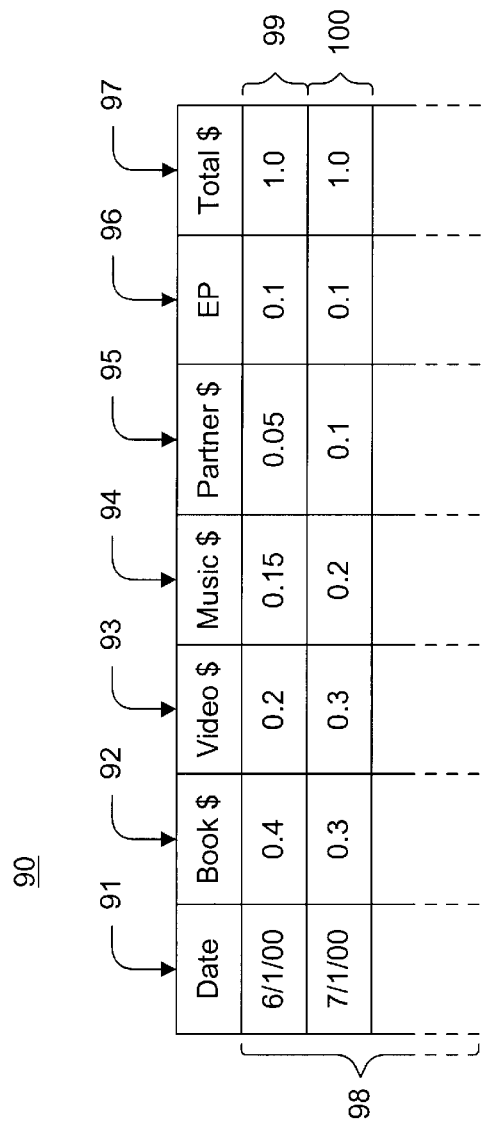
FIG. 6 is a table diagram showing, by way of example, a matrix of demographic data values.

FIG. 6 is a table diagram showing, by way of example, a matrix of demographic data values 90. These values quantify demographic information and consist of an independent variable 97 and one or more dependent variables 91–96. A plurality of records 98 are generated over time for detecting shifts in the relative weightings of these variables using data mining techniques, as further described below with reference to FIG. 13.

By way of example, two data records are shown. The independent variable 97 reflects the total amount of money spent (Total $) and the dependent variables reflect the total amount of money spent on books (Book $), videos (Video $), music (Music $), and affiliates (Partner $). In addition, the entry point (EP) to the Web site is included as a dependent variable. Based on the weightings generated for Jun. 1, 2000 (record 99), book revenue has the strongest influence on total sales while affiliate revenue has the least. However, the weightings generated for Jul. 1, 2000 (record 100) reflect a shift in the relative effect of book revenue to a shared influence between book and video revenue. Other matrices and statistical weighting models, including tree, multidimensional and neural network models, are feasible.

Figure 7:
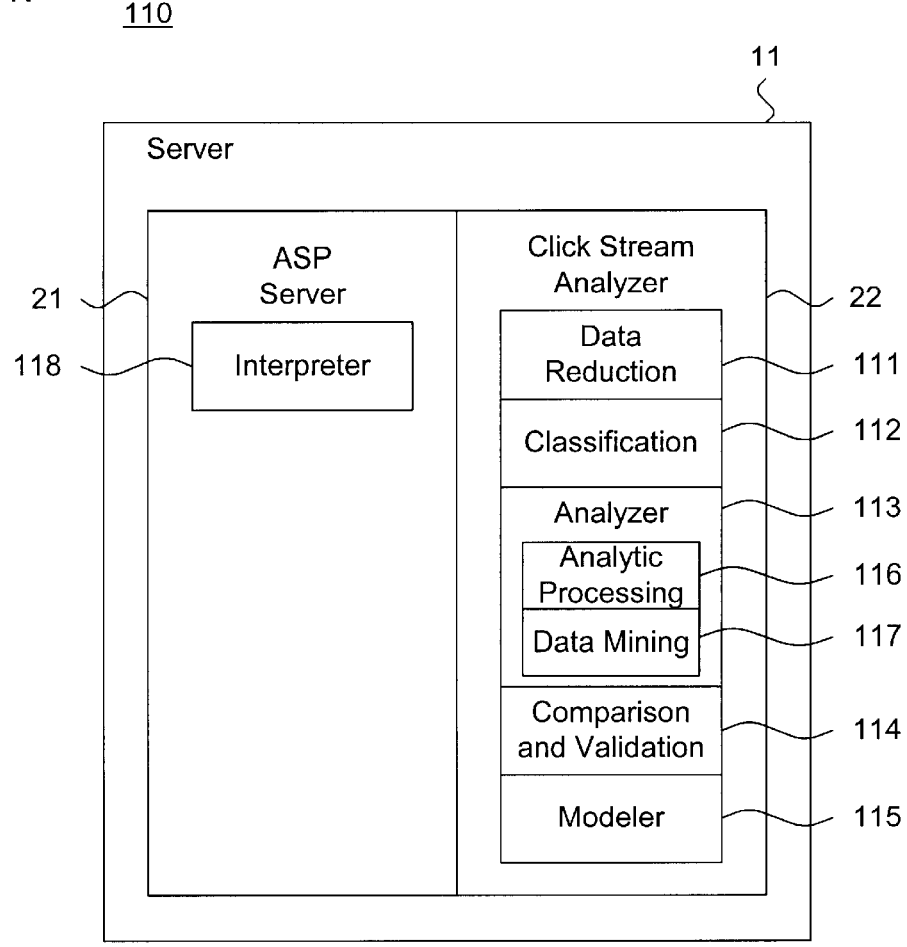
FIG. 7 is a block diagram showing the functional software modules of the server of FIG. 2.

FIG. 7 is a block diagram showing the functional software modules of the server 11 of FIG. 2. Each module is a computer procedure or program written as source code in a conventional programming language, such as the C++ programming languages, and is presented for execution by the CPU as object or byte code, as is known in the art. The various implementations of the source code and object and byte codes can be held on a computer-readable storage medium or embodied on a transmission medium in a carrier wave. The server 11 operates in accordance with a sequence of process steps, as further described below beginning with reference to FIG. 8.

The click stream analyzer 22 consists of five main modules: data reduction 111, classification 112, analyzer 113, comparison and validation 114, and modeler 115. The data reduction module 111 helps to minimize the size of click stream paths stored in the click streams database 35 (shown in FIG. 2) by compressing and generating inferences. The classification module 112 categorizes the individual click stream paths into pre-defined classes. The analyzer module 113 consists of an analytical processing submodule 116 and data mining submodule 117. These modules respectively execute pre-defined queries and statistical analyses on the data maintained in the click streams database 35. The comparison and validation module 114 compares the results of the analyzer module 113 to the demographic models 38 and presentation models 39 and the validation module 114 determines whether these models are still valid or require further evaluation. Finally, the modeler module 115 generates new demographic and presentation models.

The ASP server 21 consists primarily of an interpreter 118 for executing the ASP scripts embedded within Web page code. The interpreter 118 executes any ASP scripts encountered while requested Web pages are being served. The results of the ASP script executions are forwarded to the requesting browser applications 26 (shown in FIG. 1) as ordinarily Web page code, generally consisting of plain HTML or XML.

Figure 8:
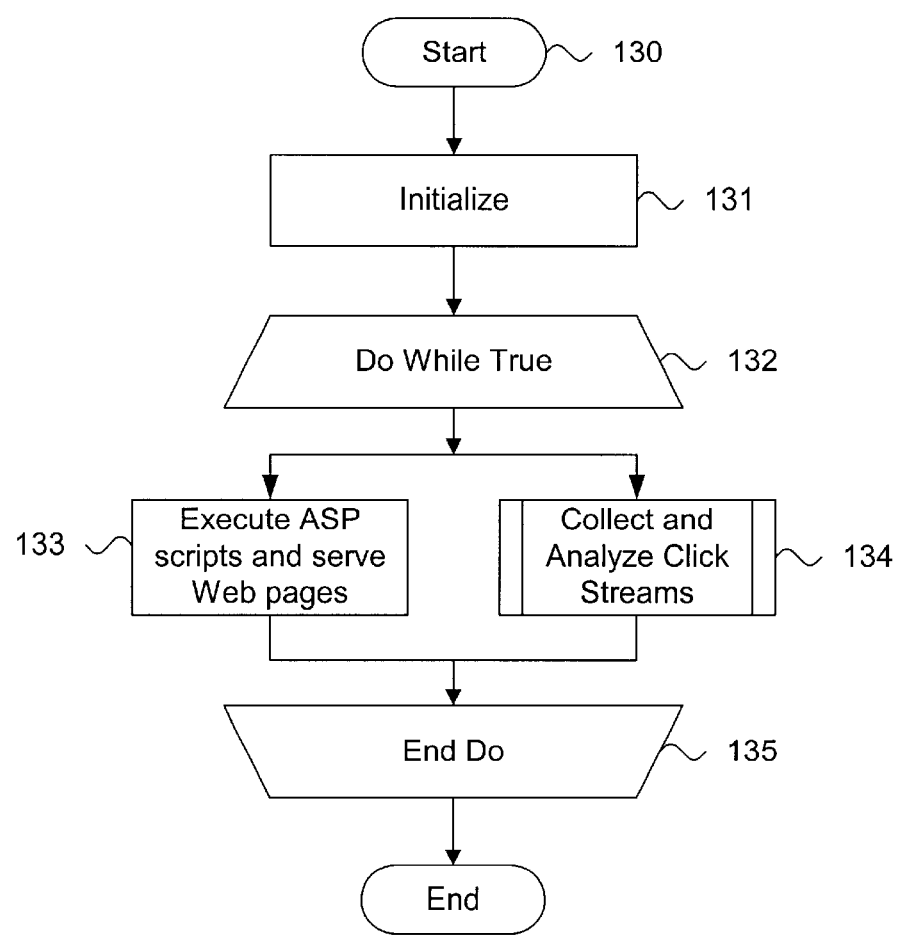
FIG. 8 is a flow diagram showing a method for dynamically evaluating an e-commerce business model through click stream analysis in accordance with the present invention.

FIG. 8 is a flow diagram showing a method for dynamically evaluating an e-commerce business model through click stream analysis 130 in accordance with the present invention. The method 130 operates in two phases. During the first phase, initialization (block 131), the ASP server 21 and click stream analyzer 22 (both shown in FIG. 1) are booted and initialized.

During the second phase, operation, e-commerce transactions are processed and tracked in two iterative threads of execution (blocks 132–135). In a first thread, the server 11 executes ASP scripts and serves Web pages (block 133) in response to consumer requests. In a second thread, click streams are collected and analyzed (block 134), as further described below with respect to FIG. 9. The threads (blocks 132–135) execute continuously until the method 130 terminates, either upon the processing of a last incoming request or upon the receipt of a terminate signal.

Figure 9:
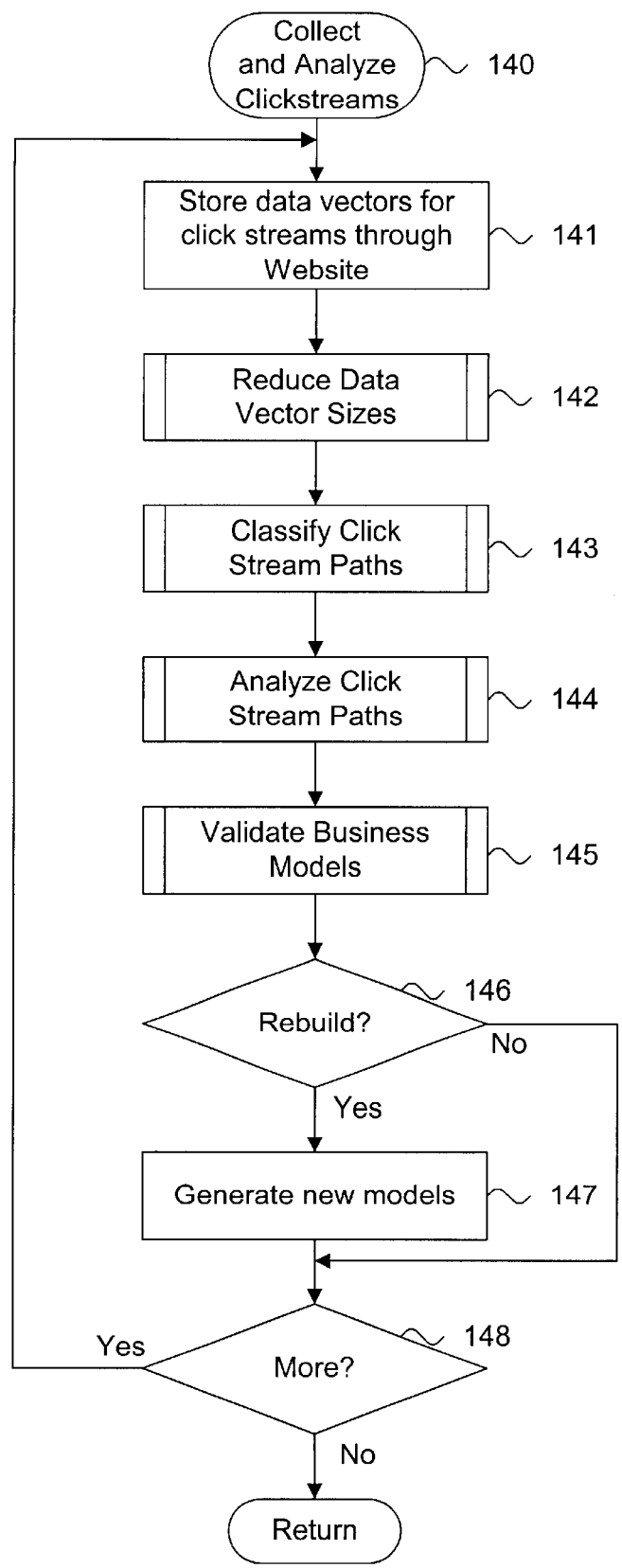
FIG. 9 is a flow diagram showing a routine for collecting and analyzing click streams for use in the method of FIG. 8.

FIG. 9 is a flow diagram showing a routine for collecting and analyzing click streams 140 for use in the method of FIG. 8. The purpose of this routine is to store data streams paths as data vectors 80 (shown in FIG. 5) and process those stored paths. Each click steam through the Web site for each session is stored as a data vector 80 (block 141). In turn, the data vectors 80 are stored in the click streams database 36 (shown in FIG. 2). The size of each data vector 80 is reduced to (block 142), as further described below with reference to FIG. 10. Each click stream path is then classified according to pre-defined user categories (block 143) and analyzed (block 144), as further described below with reference to FIGS. 11 and 12, respectively. Finally, the e-commerce business models incorporated into the Web site are validated (block 145), as further described below with reference to FIG. 13. If the e-commerce business models need to be rebuilt, as apparent from behavioral shifts or changes in weightings of dependent variables (block 146), new models are generated (block 147). Preferably, quantitative thresholds indicate when the models need to be rebuilt, but other measures are feasible. The new models are created using the same methodologies with which they were originally built, but using the updated demographic information stored in the demography database 35 (shown in FIG. 2). The methodologies for building demographic models 38 and presentation models 39 are known to those skilled in the art. If there are more consumer sessions (block 148), processing continues as before (blocks 141–147). Otherwise, the routine returns.

Figure 10:
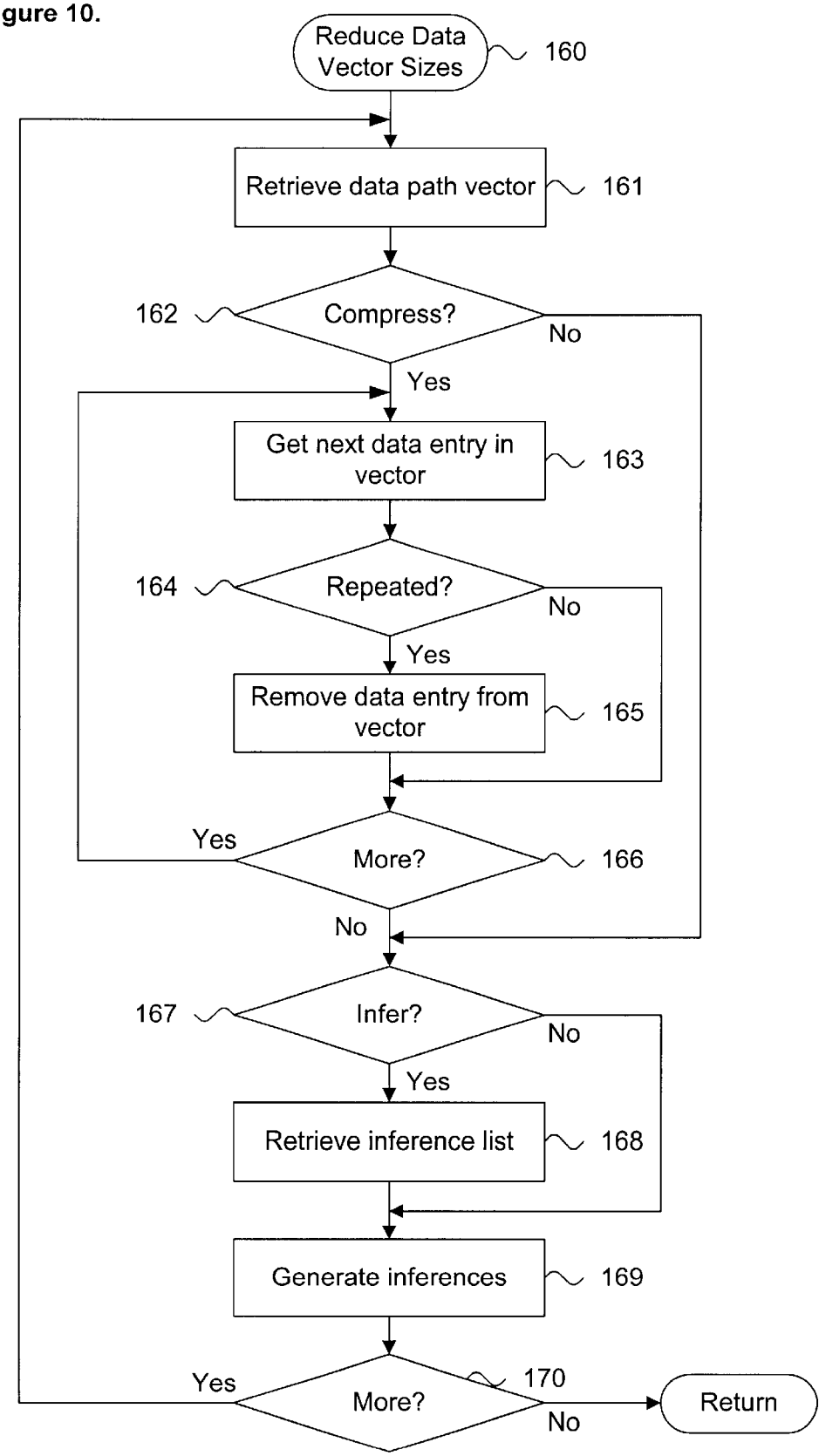
FIG. 10 is a flow diagram showing a routine for reducing data vector sizes for use in the method of FIG. 9.

FIG. 10 is a flow diagram showing a routine for reducing data vector sizes 160 for use in the method of FIG. 9. The purpose of this routine is to help minimize the storage requirements of the data vectors 80. Reducing the data vector sizes is an optional step, but helps to minimize the storage requirements needed for storing the data vectors generated by every consumer transaction session. Each data path vector 80 is retrieved from the click steams database 36 (block 161) and reduced in size by compression (blocks 162–166) or inference (blocks 167–169).

Compression removes repeated data entries from each data vector 80. For example, the data entries for the Search page 82–84 in the data path vector 80 of FIG. 5 can be compressed into a single data entry for the Search page. Thus, if the retrieved data vector 80 is to be compressed (block 162), the next data entry in the data vector 80 is obtained (block 163). If the data entry is repeated (and is not the first occurrence of that particular URL) (block 164), the data entry is removed from the data vector 80 (block 165). Compression is repeatedly performed on each remaining data entry in the data vector 80 (block 166).

Inference summarizes a data vector 80 into a succinct set of descriptors, such as, "cause and effect," "offer and acceptance," "completed order versus entry point," and the like. More precisely, an example of a "cause and effect" inference would be maintaining a tally of the number of searches performed before a purchase is made. An example of an "offer and acceptance" inference would be grouping data vectors 80 based on whether a consumer made a purchased based on a solicited sale. Finally, an example of a "completed order versus entry point" inference would be tracking those entry points into a Web site from which a purchase is ultimately made. Thus, if the retrieved data vector 80 is be inferred (block 167), a list of inferences, preferably maintained as an ancillary file 25 (shown in FIG. 1), is retrieved (block 168) and all appropriate inferences are generated (block 169).

If there are more data path vectors (block 170), processing continues as before (blocks 161–169). Otherwise, the routine returns.

Figure 11:
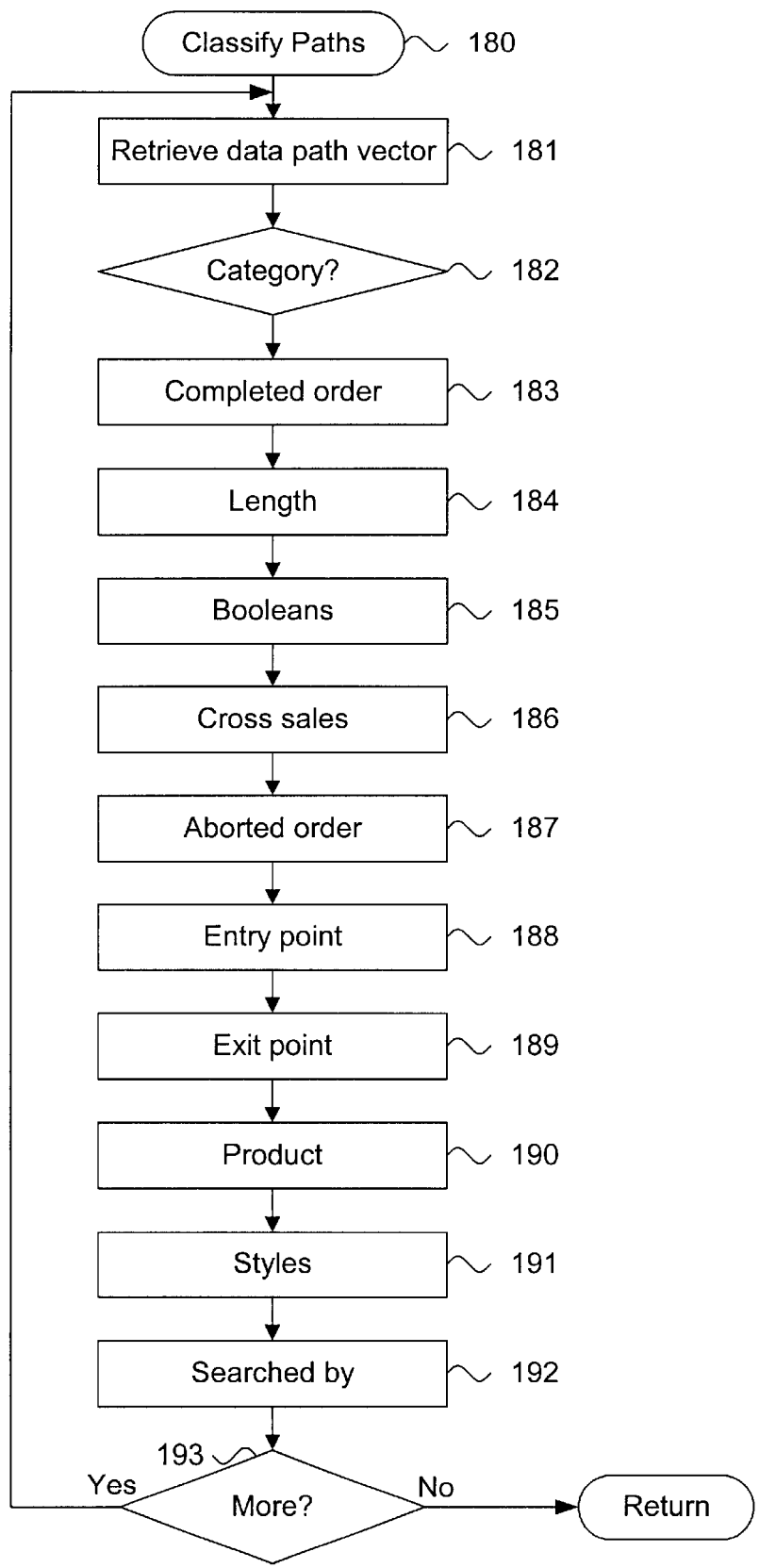
FIG. 11 is a flow diagram showing a routine for classifying a click stream path for use in the method of FIG. 9.

FIG. 11 is a flow diagram showing a routine for classifying a click stream path 180 for use in the method of FIG. 9. The purpose of this routine is to categorize each data stream path according to a user-defined set of categories and makes the data stream paths more amenable to data mining, as further described below with reference to FIG. 12. Unlike generating inferences, this routine does not attempt to reduce the data vector sizes. Rather, each data path vector 80 is retrieved from the click steams database 36 (block 181) and classified by category (block 182). In the described embodiment, the click stream paths are classified into ten main categories, as follows:

(1) Completed order (block 183): click stream paths ending with a product or service purchase.

(2) Length (block 184): number of "clicks" in the click stream path.

(3) Booleans (block 185): based on whether a given condition exists within the click stream path, such as whether a particular search engine or tool was used.

(4) Cross sales (block 186): consumer entered the Web site from an affiliate Web site.

(5) Aborted order (block 187): click stream paths ending without a product or service purchase.

(6) Entry point (block 188): initial Web site in data stream path.

(7) Exit point (block 189): last Web site in data stream path.

(8) Product (block 190): type of product (or service) purchased, if any.

(9) Styles (block 191): style of product (or service) purchased, if any.

(10) Searched by (block 192): search categories used.

Other classification categories are feasible. If there are more data path vectors (block 193), processing continues as before (blocks 181–192). Otherwise, the routine returns.

Figure 12:
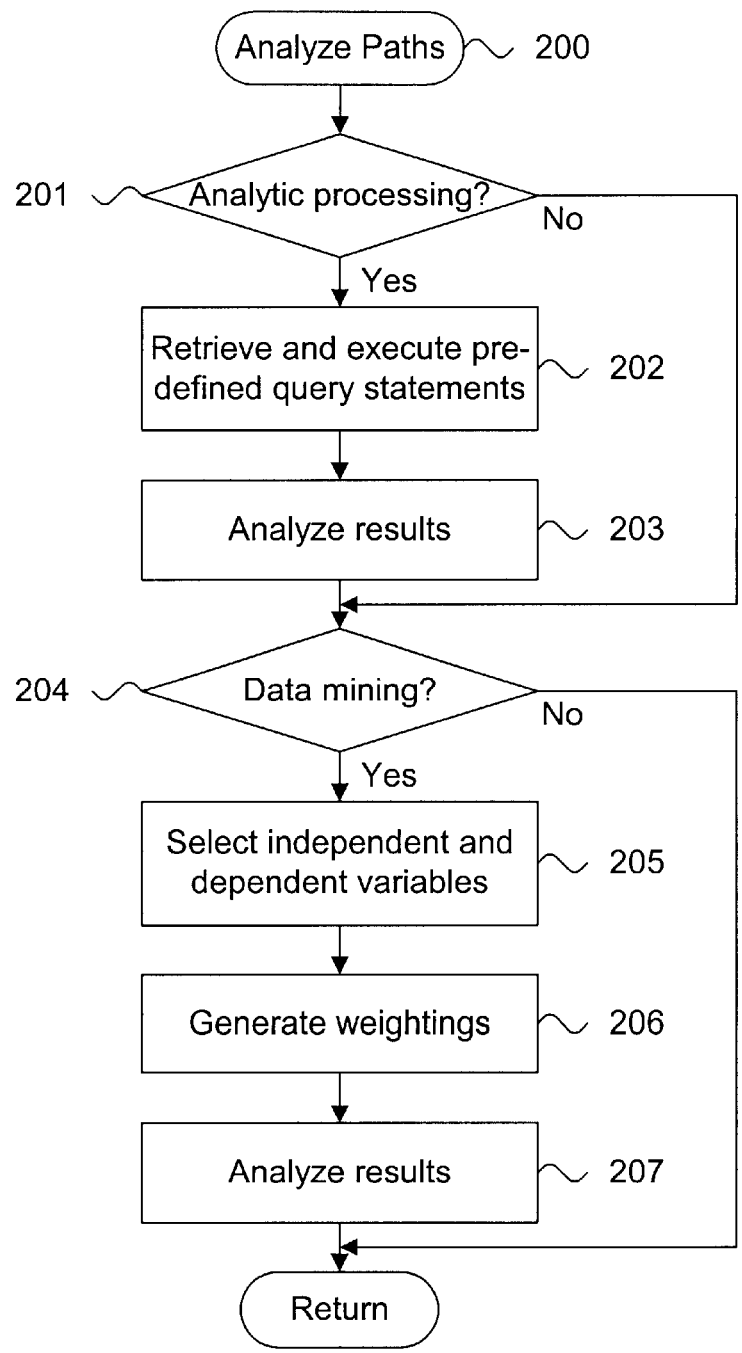
FIG. 12 is a flow diagram showing a routine for analyzing data stream paths for use in the method of FIG. 9.

FIG. 12 is a flow diagram showing a routine for analyzing click stream paths 200 for use in the method of FIG. 9. The purpose of this routine is to quantify the data stream paths into objectified measures. The data stream paths are analyzed through analytic processing (blocks 201–203) and data mining (blocks 204–207). Other click stream path analysis techniques are feasible.

Analytic processing involves executing queries on the click stream paths stored in the click streams database 36 (shown in FIG. 2). The queries are preferably written in a standardized query language, such as the Structured Query Language (SQL) and can be single or multiple statement queries. For example, a single statement query for determining a hierarchical listing of the effective sales entry points into a vendor Web site is:

```
Select $, Entry-point
   From Click
   Where $ > 200
   Group by Entry-point
   Order by $
``` where Entry-point is the initial Web site in the data stream path and Click is the click streams database 36. This query statement returns those Web site entry points from the click streams database 36 whose sales exceeding $200.00. As a further example, a multiple statement query for determining combined book and video sales sold from the same product category:

```
Select $, Prod_book, Id
   From Click
   Where $ > 200
Insert into Temp1
Select $, Prod_video, Id
   From Click
   Where $ > 200
Insert into Temp2
Select Book, Video, $, Id
   From Temp1, Temp2
   Where Id, Temp1 and Temp2
   And where Book.Prod.Id = Video.Prod.Id
``` where Click is the click streams database 36, Prod_book and Prod_video are product types, Id is a product category, Temp1 and Temp2 store interim query results, and the Book.Prod.Id and Video.Prod.Id are specific instances of book and video products falling into the same product category. These query statements return those book and video sales categories in the click streams database 36 whose sales exceed $200.00.

Data mining involves creating a matrix 90 (shown in FIG. 6) of independent and dependent variables 91–97 and determining their relative weights. Data mining involves creating numerical correlations between unique data entries in the click stream paths using advanced statistical analysis tools, such as the Oracle Darwin data mining tool, licensed by Oracle Corporation, Redwood Shores, Calif.

Thus, if analytical processing is selected (block 201), the pre-defined query statements are retrieved and executed against the click streams database 36 (block 202) and the results are analyzed (block 203). Similarly, if data mining is selected (block 204), an independent variable 97 and dependent variables 91–96 are selected (block 205). The relative weightings of the dependent variables 91–96 are generated (block 206) and the results analyzed (block 207). The routine then returns.

Figure 13:
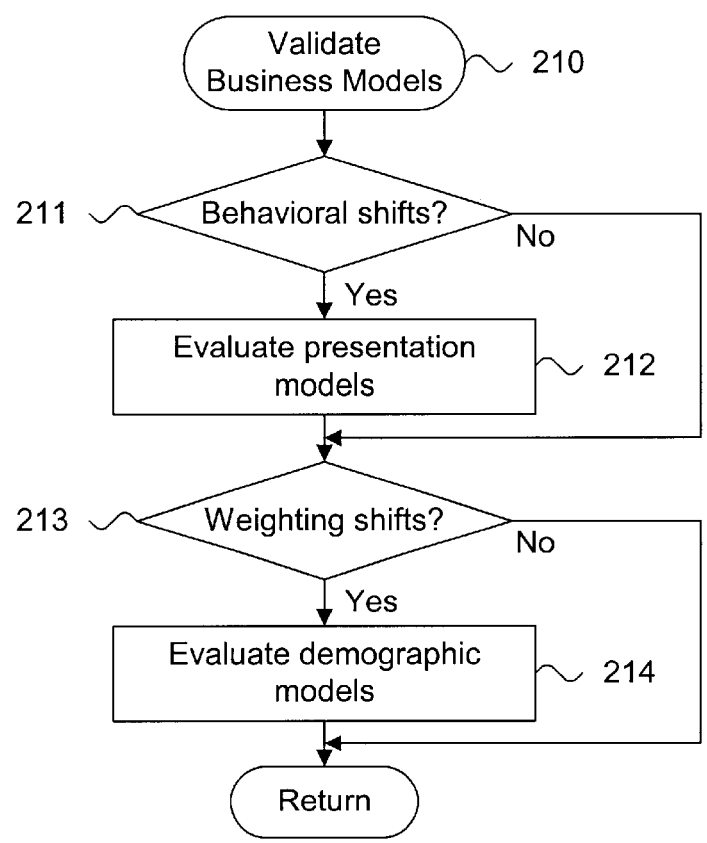
FIG. 13 is a flow diagram showing a routine for validating e-commerce business models for use in the method of FIG. 9.

FIG. 13 is a flow diagram showing a routine for validating e-commerce business models 210 for use in the method of FIG. 9. The purpose of this routine is to determine whether the e-commerce business models currently in use require updating and reevaluation. Behavioral shifts are quantitative measures that equate performance to behavior. For instance, an increase in purchasing as measured by dollar revenue might indicate effective presentation models 39 (shown in FIG. 2). Similarly, longer sessions as measured by click stream path lengths with long series of unsuccessful searches might indicate poor presentation models 39.

Weighting shifts are changes in the dependent variables 91–96 that exceed some pre-determined thresholds. Changes to the demographic models 38 (shown in FIG. 2) represent shifts in the customer segments that occur relatively slowly over time.

Thus, behavioral shifts (block 211) indicate a need to evaluate the presentation models 39 (block 212) while shifts in the weightings of dependent variables 91–96 (block 213) indicate a need to evaluate the demographic models 38 (block 214). Upon the completion of the evaluations, the routine returns.

Using the approach of the present invention, e-commerce business models, including demographic and presentation models, can be continually evaluated and, if necessary, regenerated in an on-the-fly basis using click stream analysis. The raw click stream paths through a Web site are classified, analyzed and correlated to quantitative measures. These measures can be used to validate the e-commerce business models while data is still fresh and relevant.

While the invention has been particularly shown and described as referenced to the embodiments thereof, those skilled in the art will understand that the foregoing and other changes in form and detail may be made therein without departing from the spirit and scope of the invention.

What is claimed is:

1. A method for performing click stream analysis, comprising:

storing click stream paths relating to a Web site, the Web site comprising a plurality of related Web pages, said Web pages structured in a hierarchical manner, each said Web page comprising one or more hyperlinks selectable by a user;

processing said click stream paths by:
selecting an independent variable associated with the click stream paths and at least one dependent variable associated with the click stream paths and determining a weighting for each at least one dependent variable; and analyzing the click stream paths to determine at least one of efficacy of presentation and shifts in demography.

2. A method according to claim 1, wherein the step of processing further comprises:

performing a series of one or more queries on the click stream paths.

3. A method according to claim 1, wherein the step of analyzing comprises analyzing a presentation model to determine the efficacy of the presentation.

4. A method according to claim 3, further comprising:

determining whether the efficacy of said presentation model is below a specified threshold;

if it is determined that the efficacy of said presentation model is below said specified threshold, revising the presentation model.

5. A method according to claim 1, wherein the step of analyzing comprises analyzing a demographic model to determine the efficacy of the demographic model.

6. A method according to claim 5, further comprising:

determining whether the efficacy of said demographic model is below a specified threshold; and if it is determined that the efficacy of said demographic model is below the specified threshold, revising the demographic model.

7. A method according to claim 1, wherein the step of storing click stream paths includes storing a plurality of data vectors that each represent a click stream path through the Web site, each data vector comprising a set of data entries, each data vector corresponding to Web content selected via the hyperlinks in the Web pages of the Web site.

8. A method according to claim 7, further comprising the step of classifying click stream paths.

9. A method according to claim 8, wherein the step of classifying comprises classifying click steam paths based on at least one of said data entries in said data vectors.

10. A method according to claim 9, further comprising a step of selecting the at least one data entry to be the basis for classification, wherein the at least one data entry is selected based on at least one characteristic among the set of characteristics consisting of completed orders, path length, Boolean operations, cross-sales, aborted orders, origin Web site, exit Web site, product, styles, cause and effect, and search category.

11. A method according to claim 8, further comprising:

reducing the size of the data vectors prior to classification.

12. A method according to claim 11, further comprising:

wherein reducing the size of the data vectors comprises compressing the data vectors by removing each data entry corresponding to a selected Web page which is repeated within the data vector.

13. A method according to claim 11, further comprising:

generating inferences from at least one data entry in at least one of the data vectors to reduce the data vector sizes.

* * * * *